Jan. 15, 1957 L. E. DOSTERT 2,777,901
BINAURAL APPARATUS FOR TEACHING LANGUAGES
Filed Nov. 7, 1951 4 Sheets-Sheet 1
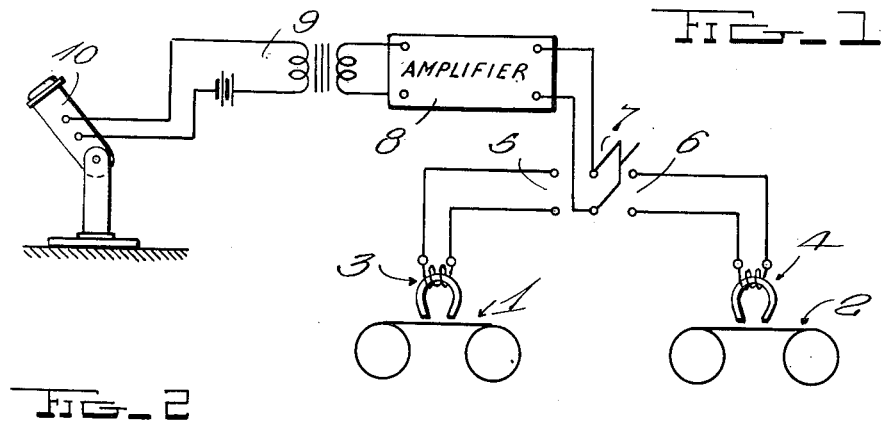
FIG_1
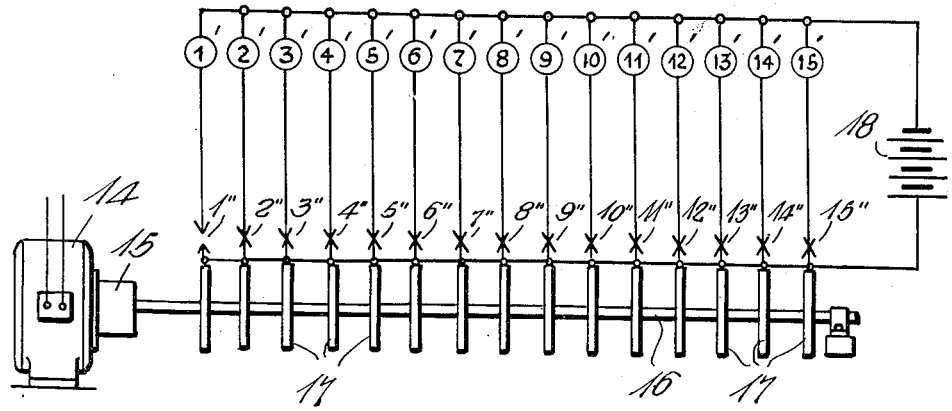
FIG_2
FIG_3
My father arrived | this morning at ten | he left again | before noon
Mon père est arrivé | ce matin a dix heures | il est reparti | avant midi
INVENTOR
Leon E. Dostert,
BY Bernard F. Garvey
ATTORNEY Jan. 15, 1957 L. E. DOSTERT 2,777,901
BINAURAL APPARATUS FOR TEACHING LANGUAGES
Filed Nov. 7, 1951 4 Sheets-Sheet 2
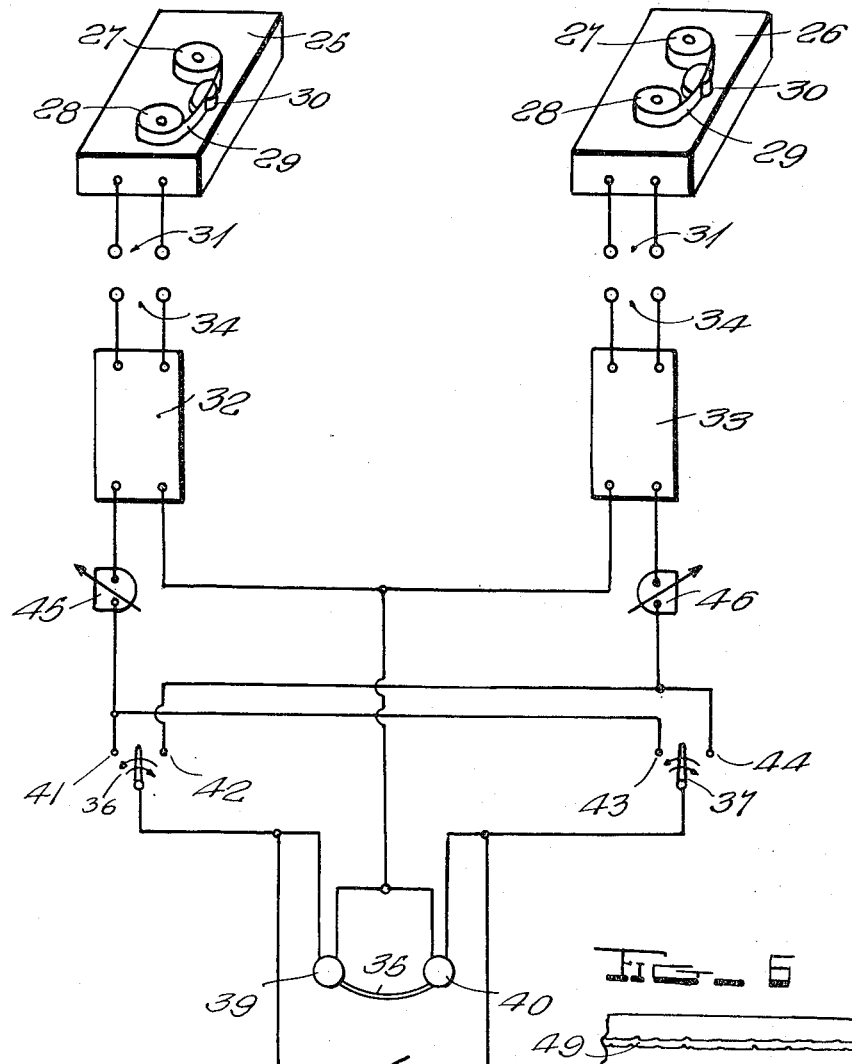
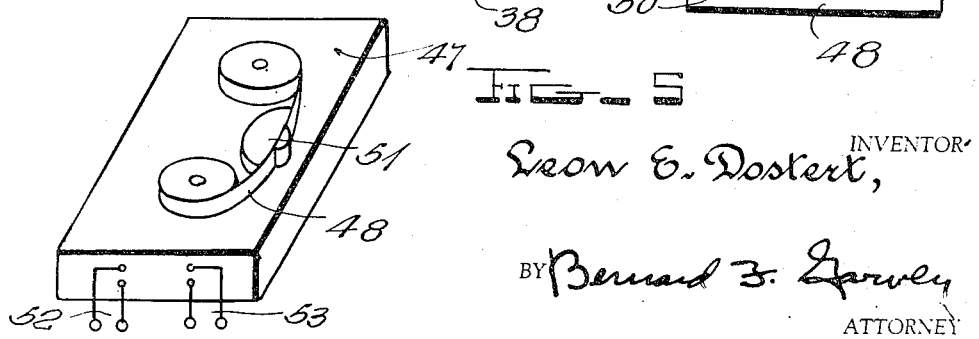
Leon E. Dostert, INVENTOR
BY Bernard F. Garvey
ATTORNEY Jan. 15, 1957     L. E. DOSTERT     2,777,901
BINAURAL APPARATUS FOR TEACHING LANGUAGES
Filed Nov. 7, 1951     4 Sheets-Sheet 3
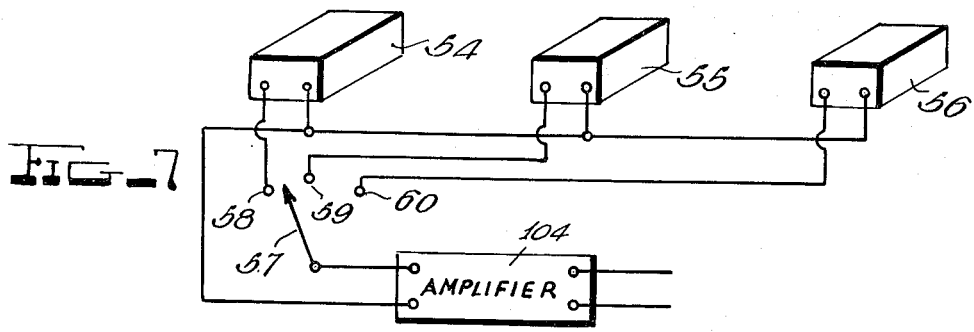
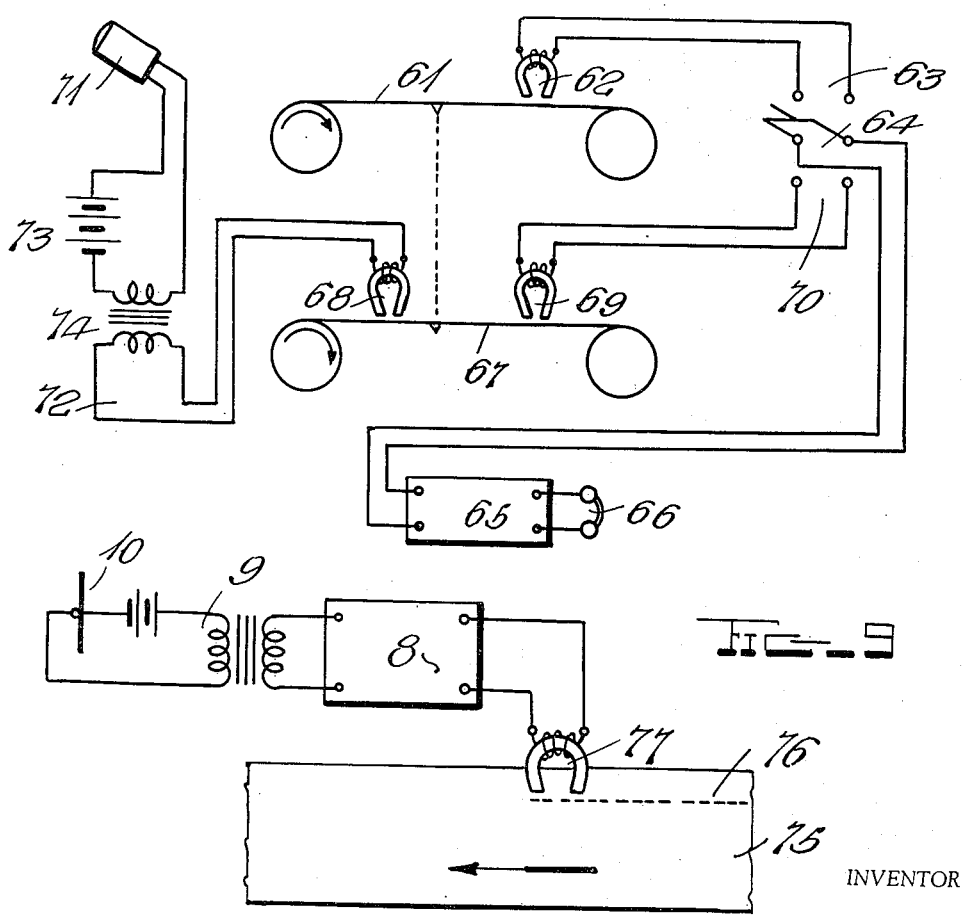
INVENTOR
Leon E. Dostert,
BY Bernard F. Garvey
ATTORNEY Jan. 15, 1957  L. E. DOSTERT  2,777,901
BINAURAL APPARATUS FOR TEACHING LANGUAGES
Filed Nov. 7, 1951  4 Sheets-Sheet 4
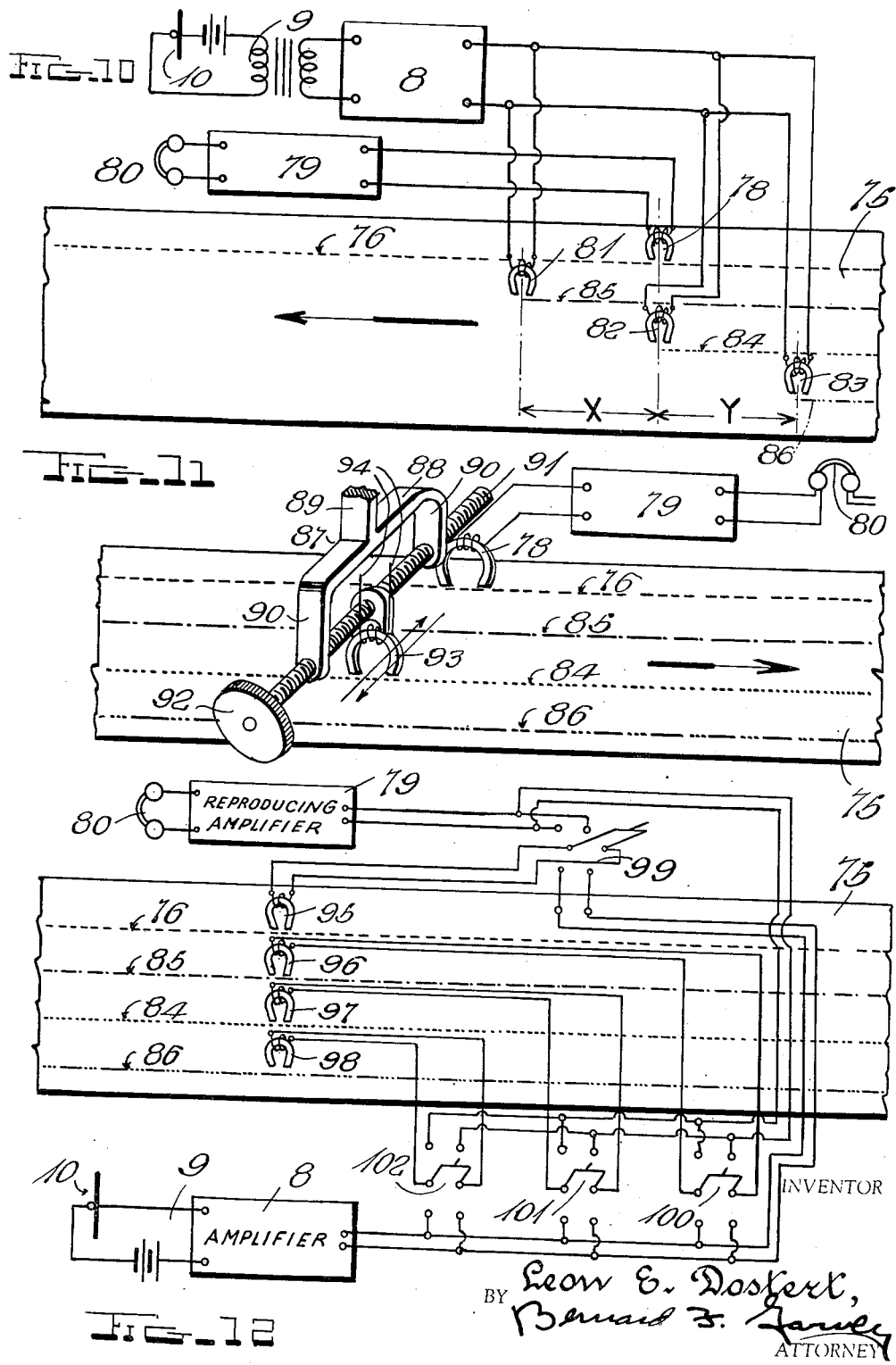
INVENTOR
Leon E. Dostert,
BY Bernard F. Garvey
ATTORNEY United States Patent Office 2,777,901
Patented Jan. 15, 1957

2,777,901

BINAURAL APPARATUS FOR TEACHING LANGUAGES

Leon E. Dostert, Washington, D. C.

Application November 7, 1951, Serial No. 255,211

5 Claims. (Cl. 179—100.2)

My invention relates broadly to a method and apparatus for use in teaching foreign languages; and, more particularly to a method and apparatus for the teaching of an unknown language in relation to a known language by providing auditions of the same expression in both languages.

The principal object of my invention is to provide a method wherein known and unknown language recordings may be selectively reproduced in relation to one another so that intelligence is conveyed from either or both recordings for the instruction of students.

Another object of my invention is to provide a method of preparing recordings of known and unknown languages in such timed relation with respect to each other that the two languages may be reproduced in comparative relations for audible analysis and study by language students endeavoring to learn the unknown language.

Still another object of my invention is to provide a method of teaching unknown languages by comparison with a known language wherein recordings of the known language and a translation thereof into an unknown language may be selectively recorded and reproduced in multiple sound tracks in any one of several sequential relations, that is, with the recording and reproduction of the translations of the known language into the unknown language presynchronized or simultaneously synchronized or post synchronized with respect to the recording and reproduction of the known language.

A still further object of my invention is to provide an apparatus for reproducing prepared recordings of a known language and a translation thereof into an unknown language as will enable students to readily compare the characteristics thereof and by such comparison become so familiar with the unknown language as to readily interpret the translation thereof in terms of the known language.

Still another object of my invention is to provide a reproducing system for bilingual audition apparatus by which reproductions of a known language and a translation thereof may be selectively reproduced in a telephone circuit bilaterally or unilaterally relative to each other at the will of the student studying the translation of the known language by audible comparison with a known language.

A further object of my invention is to provide an arrangement of comparative language recorders by which a student may directly compare his own proficiency in any language with respect to a reproduction of the correct use of the language under study for thus increasing personal ability in such language.

Still another object of my invention is to provide a system of language study by comparison methods between the reproduction of a known language and the selective reproduction of translations of the known language into any one of several different unknown languages for broadening the knowledge of a student in the several different languages.

A still further object of my invention is to provide a multiple channel recording and reproducing system for teaching languages in which translations of a known language are recorded in presynchronized, simultaneously synchronized and/or post-synchronized relationship for selective reproduction relative to the known language for enabling students to become familiar with the unknown languages.

Other and further objects of my invention are to provide a method and apparatus for the training of students in languages, in a manner which has been found to be more rapid and efficient than conventional text book studies, as is set forth in the specification hereinafter following by reference to the accompanying drawings in which:

Figure 1 diagrammatically illustrates the method of recording a known language and an unknown language according to the method of my invention; Fig. 2 schematically shows a timing system which I employ as part of the method of my invention for the proper sequential recording of both the known and unknown languages in such relationship that proper comparison of the characteristics of the two languages can be made during the reproduction process; Fig. 3 is an illustrative chart showing the manner of dividing the texts of both the known and unknown languages into groups which are recorded in the manner illustrated in Fig. 1 according to the operation of the timing system shown in Fig. 2; Fig. 4 diagrammatically and schematically shows a reproducing system employing the recordings prepared according to the principles shown in Figs. 1–3 and illustrating particularly the selective control system for the bilingual reproduction provided by my method; Fig. 5 schematically shows the application of my invention to multiple language records on the same record operating apparatus; Fig. 6 shows a fragmentary portion of a magnetic record tape as used in the apparatus of Fig. 5, and illustrating particularly a representation of the multiple magnetic records on the same magnetic recording tape; Fig. 7 is a schematic view illustrating one manner of modifying the arrangement shown in Fig. 4 for the selective comparison of any one of three unknown languages with respect to the known language; Fig. 8 shows an arrangement of recorders for carrying out the principles of my invention whereby a student may compare his personal ability and characteristics in the reproduction of an unknown language in comparison with a standard or proper and approved reproduction thereof; Fig. 9 schematically shows a further modified form of my invention in which a known language is recorded on a tape having provision for receiving a multiple number of different recordings of translations of the known language in different orders; Fig. 10 schematically shows an arrangement for recording the multiple channel translations of the previously recorded known language in predetermined order; Fig. 11 schematically illustrates one method of selectively reproducing the multiple channel recordings prepared in accordance with the arrangements of Figs. 9 and 10; and Fig. 12 shows a further modified form of my invention for multiple channel recording and reproduction of a known language and translations thereof.

Primarily my invention is concerned with recorded speech which is placed upon conventional recording media such as phonograph records, films, magnetic tapes, or wires and the like. The technique of preparing the records is of great importance in the proper carrying out of my invention. While I have disclosed my invention as relating to a bilingual method and apparatus wherein the English language is considered as the base to which the unknown language, or translation, is compared, it is to be understood that the comparison may be revised or any two languages may be audibly compared and that the reference herein to the English language as related to other languages is to be considered in the illustrative sense and not in the limiting sense.

The recordings are initially prepared by an expert in language study according to the method depicted in Figs. 1, 2 and 3. Fig. 1 represents the recording system employing two magnetic recorders designated by reference characters 1 and 2, provided with recording heads 3 and 4, respectively, which connect to the two poles 5 and 6, respectively, of the double pole double-throw switch 7. The switch blades of the double pole double-throw switch 7 connect with the output of amplifier 8, the input of which connects to the voice channel circuit 9 controlled from microphone 10. With switch 7 thrown to position 5 a recording is placed on magnetic recording 1 which may be the English script 11 represented in Fig. 3 which has been initially divided into phrases or sections designated by markings 12 predetermined as to reading time to be correlated with the visual timing system shown in Fig. 2. The timing system of Fig. 2 is representative of any means by which the signal lamps 1', 2', 3', 4', 5', 6', 7', 8', 9', 10', 11', 12', 13', 14' and 15' are controlled for predetermined intervals of time. In the timing arrangement illustrated which is the invention of A. C. Holt of International Business Machines Corporation, a driving motor 14 operates through a reduction gear system 15 to drive shaft 16 for operating a system of cams 17 which sequentially open a multiplicity of contacts 1", 2", 3", 4", 5", 6", 7", 8", 9", 10", 11", 12", 13", 14" and 15" for successively extinguishing the signal lamps 1', 2', 3', 4', 5', 6', 7', 8', 9', 10', 11', 12', 13', 14' and 15' by opening the electrical circuit from the power source designated at 18 at a controlled rate, such as an interval of 30 seconds, 60 seconds, or some other selected time interval to which the reading time of the English script 11 in Fig. 3 has been correlated, enabling the prescribed portion of the text to be placed upon the recording 1 within the parameters determined by the time interval during which the corresponding signal lamp is lighted. In the example illustrated, signal lamp 1' has been extinguished and the reader has completed a reading of that portion of the English script designated by the interval 19 in the English script 11 of Fig. 3. If the reading is completed while lamp 1' is lighted the reader pauses before commencing the reading of section 20 of the script 11 of Fig. 3 until lamp 1' extinguishes, whereupon the reader starts reading section 20 of script 11 of Fig. 3 and completes this before lamp 2' extinguishes. The same method is pursued to complete the English recording on magnetic record 1 in groups of phrases or sections within the marks 12 of the English script constituting the known language (K).

Recorder 1 is now stopped and switch 7 is moved to the right to connect the output of amplifier 8 with the recording head 4 of magnetic recorder 2 and the recorder 2 operated while the reader speaks into the microphone 10 to record the translation shown at 21 in Fig. 3 of the English script 11 previously read and recorded on magnetic recorder 1. In the example illustrated herein a French script has been shown at 21 in Fig. 3, but as heretofore explained, it will be understood that any unknown language may be recorded on magnetic recorder 2. The French script 21 is divided by marks 22 into phrases or sections 23, 24, etc., corresponding to the phrases or sections 19 and 20 of the English script 11 and the reader must record all of the French script within the limits of adjacent marks, while a corresponding lamp 1', 2', 3', 4', 5', 6', 7', 8', 9', 10', 11', 12', 13', 14', and/or 15' remains lighted. When the reader completes a division of the script and the corresponding lamp is still lighted, the reader pauses until the particular lamp extinguishes before continuing with the succeeding phrase or section of the script. In this way the French script is recorded sequentially on magnetic recorder 2 in time sequence relation to the English script previously recorded on magnetic recorder 1.

In Fig. 4 I have shown one form of reproducing system for carrying out the principles of my invention wherein a pair of magnetic tape reproducing machines of identical characteristics are illustrated at 25 and 26. Each of the said machines is supplied with a supply reel 27 and a takeup reel 28 between which a tape 29 is caused to move past a reproducer 30 in such a manner that the magnetic recording upon the tape 29 is sensed by the reproducer 30 and converted into electrical variations at the terminals 31. The terminals of each magnetic reproducer 25 and 26 are connected respectively to amplifiers 32 and 33 by means of terminals 34 and the outputs of the respective amplifiers are fed to the circuit connections shown to a pair of head phones 35. The circuit connections are capable of being modified by means of three switches 36, 37 and 38, whereby the electrical manifestations from each of the said magnetic reproducers can be switched into either or both of the phones 39 and 40, which together make up the head phones 35. For example, a signal being reproduced from the magnetic reproducer 25 will be delivered to phone 39 when the switch 36 is thrown to the contact 41, and similarly a signal from the magnetic reproducer 26 will be received in the phone 39 when the switch 36 is thrown to the contact 42. In a similar manner, the phone 40 will be connected to the magnetic reproducer 25 when switch 37 is thrown to the contact 43, and magnetic reproducer 26 will be connected to the phone 40 when the switch 37 is thrown to the contact 44. When the switch 38 is closed, the phones 39 and 40 are connected in parallel so that when switch 36 is thrown to contact 41, or when switch 37 is thrown to contact 43, both phones will receive signals from the magnetic reproducer 25, and when the switches 36 and 37, respectively, are thrown to the contacts 42 and 44, a signal from the magnetic reproducer 26 will be received by each phone 39 and 40. Consequently, if the switch 36 is thrown to contact 41 and the switch 37 is thrown to contact 44, both magnetic reproducers 25 and 26 will be connected to both phones of the head phones 35 provided that the switch 38 is closed. For normal operation, to best illustrate the invention shown in Fig. 4, the switch 36 is thrown to contact 41 and the switch 37 is thrown to contact 44 (or the switch 36 can be thrown to contact 42 and the switch 37 can be thrown to contact 43), the switch 38 being retained open.

Let it be assumed that magnetic reproducer 25 has placed upon it a tape 29 into which has been recorded a message and that the message upon the tape is being sensed by the reproducer 30 so that with the last mentioned circuit connections established, the signal derived from the tape 29 of the magnetic reproducer 25 is delivered to the phone 39. Let it be further assumed that a similar message is recorded into the tape 29 upon the magnetic reproducer 26 and that it is sensed by the reproducer 30 to deliver signals via the connections already mentioned to phone 40. Let it be further assumed that the messages upon the tapes of the respective magnetic reproducers 25 and 26 are identical in meaning, but that the message on magnetic reproducer 25 is recorded in the English language and the message upon the tape of the magnetic reproducer 26 is in the French language. Still further let it be assumed that the tapes 29 of the respective magnetic reproducers 25 and 26 are reproduced simultaneously. It will be understood therefore that the same message will be delivered to the phone 39 from the magnetic reproducer 25 as will be delivered to the phone 40 from the magnetic reproducer 26 with the exception that the message audible in phone 39 will be in English and the message audible in phone 40 will be in French. The intensities of the signals in the phones 39 and 40 can be regulated by a pair of volume controls, or rheostats, 45 and 46, connected into the circuits of the respective magnetic reproducers 25 and 26.

In the teaching of a foreign language, it has been demonstrated, after the student has learned the fundamental sounds or symbols with which to express ideas in that language, that further perfection in acquiring proficiency in understanding the language can be best obtained by associating expressions in the foreign language with expressions conveying the same meaning in the language with which one is most familiar. The subject device is particularly adapted to bring about such results. For example, a magnetic tape may be prepared by recording certain expressions in English, and such tape placed upon magnetic reproducer 25; another tape is prepared by recording in French and placed upon magnetic reproducer 26. If the magnetic reproducers 25 and 26 are now operated simultaneously, making use of the electrical circuit and apparatus previously described, one who is familiar with English, having placed the head phone 35 over his ears, would receive a message in English over the phone 39 and simultaneously the equivalent message in French over the phone 40. By association, the pupil will then become familiar with each language in terms of the other, and since it may be assumed that the pupil is proficient in one of the languages, by association he will rapidly be familiarized with the other language, which, let it be assumed, is not as well known to him. In this manner, the student can study and increase his language proficiency without the aid of other devices or other external means. It will be understood that there is no limit as to the variety and extent of the recordings which can be placed upon the respective tapes 29.

A further modification of this invention is shown in Fig. 5 wherein a single magnetic reproducer 47 is provided with a single magnetic tape 48 having two magnetic tracks 49 and 50 represented in Fig. 6, such magnetic tapes being well known in the art. Likewise, the reproducer 51 is provided with dual sensing means for reproducing the information contained in each track of the tape 48 and translating said information into electrical impulses which are delivered to the terminals 52 and 53, respectively. The terminals 52 and 53, respectively, may be connected to amplifiers such as are shown in Fig. 4 via terminals 34, thereby providing a more compact modification of the invention as shown in Fig. 4. Other variations of the device and arrangements of a similar nature may also be used in order to reproduce simultaneous signals in different languages without altering the spirit and letter of the invention.

Fig. 7 shows the adaptability of my invention for comparing a multiplicity of different unknown languages with the known language. I may provide any number of magnetic tape reproducing machines, each provided with a magnetic record in a different language prepared according to the process described in connection with Figs. 1, 2 and 3. For purposes of explaining this phase of my invention I have shown magnetic tape reproducing machines at 54, 55 and 56, each provided with a magnetic record in a different language. A selector switch 57 connects the outputs of the magnetic tape reproducing machines with the input of amplifier 104 connected with the student's circuit as previously explained in connection with Fig. 4. By moving selector switch 57 to any one of contacts 58, 59 or 60, the magnetic tape reproducing machines 54, 55 or 56 may be selectively connected with the receiving telephone circuit for comparison with a known language in the manner set forth in Fig. 4.

In Fig. 8 I have shown a form of my invention in which a record of the unknown language is played back from the magnetic tape reproducer 61 through pickup head 62 leading to the upper pair of contacts 63 of double-pole, double-throw switch 64, the blades of which connect to the input of amplifier 65 whose output connects with the telephone headset 66 worn by the student. By this arrangement the student may listen to the proper way of speaking the unknown language. I provide a second magnetic tape recorder and reproducer shown at 67 operated in synchronism with the magnetic tape reproducer 61 and having a magnetic recording head 68 and a magnetic reproducing head 69 spaced therefrom along the magnetic record. The student, after listening to the properly spoken unknown language with switch blades 64 in the upper position in connection with contacts 63, moves the switch blades 64 to the lower position in connection with contacts 70 connecting reproducing head 69 to the input of amplifier 65. The student now speaks into microphone 71 controlling the circuit 72 to recording head 68 through potential source 73 and transformer 74 and records on magnetic record 67 the student's concept of how the unknown language properly reproduced from record 67 should be spoken. That is to say, the student attempts to imitate or record in similitude the properly spoken unknown language previously recorded by the instructor on record 61. The student then plays back the record in similitude on magnetic tape 67, reproducing through pickup head 69 and amplifier 65 and telephones 66 the student's spoken version of the unknown language. The recording head 68 and the reproducing head 69 are so spaced that accurate phasing of the student's recording on record 67 with respect to the instructor's recording on record 61 is assured when switch 64 is manipulated to change the reproduction at telephones 66 from the student's version of the language with respect to the instructor's properly pronounced version of the language. The record 61 is operated in synchronism with the record 67. This process is repeated from time-to-time, by trial and error, until the student is so familiarized with the proper manner of speaking the unknown language that the student's own reproduction thereof becomes a substantial duplication of the original instruction.

In Fig. 9 I have shown a further modified form of my invention in which a known language is recorded on a wide tap 75 in a wave trace represented at 76 adjacent one edge of the tape. The recording process is carried out using the microphone circuit illustrated in Fig. 1, including microphone 10, modulation circuit 9, and amplifier 8, connected to the recording head designated at 77. The fact that the known language is recorded adjacent the peripheral edge of the tape 75 provides space for the recording of the translation of the known language in differing relationships, that is, in a condition of "lead" with respect to the known language; in a condition which is simultaneous with the known language; or in a condition which lags the known language.

In Fig. 10 I have shown the versatile arrangement which such recording permits. For example, the tape 75 which has been prepared in accordance with the method illustrated in Fig. 9 and provided with the recording of the known language 76 adjacent one edge of the tape, is moved through a recording machine with the reproducing head 78 connected to reproducing amplifier 79 and to telephones 80, so that the known language may be listened to while the unknown language is recorded upon the tape in three different conditions. A recording circuit identical to that explained in connection with Figs. 1 and 9 is employed as shown at 8, 9 and 10, except that in the arrangement of Fig. 10, recording heads are displaced in predetermined positions linearly of the tape. I have shown three such recording heads, that is, the recording heads at 81, 82, and 83. All of the recording heads are excited simultaneously but they are effected to activate the tape magnetically at displaced positions linearly of the tape. Recording head 82 is directly aligned with reproducing head 78 which occupies the same relative position occupied by recording head 77 in the arrangement of Fig. 9. Under these conditions the translation of the known language which is being reproduced from trace 76 is recorded simultaneously with the reproduction of the known language by head 82 which records wave trace 84. At the same time recording head 81 is recording wave trace 85 but in a position which leads wave trace 84 by the linear distance between recording head 81 and recording head 82. This assumes the magnetic tape 75 is moved toward the left as indicated by the arrow. At the same time the known language is being recorded in wave trace 86 by recording head 83 but in a position which lags the recording of wave trace 84 by the linear distance X between recording heads 83 and 82, which is the distance Y. The importance of this recording arrangement will be more clearly understood by reference to Fig. 11, in which the same tape 75 is operated in the direction of the arrow toward the right which reproduces the known language from reproducing head 78 through amplifier 79 and telephones 80 from the known language wave trace 76 which is the same operation explained in connection with Fig. 10. However, tape 75 now contains three other records of the known language, that is, the wave trace 84 which is a simultaneous translation of the known language 76 and the wave traces 85 and 86 which are corresponding reproductions of the translation constituted by the recording 84 except that the translation 85 leads the translation 86 by the time interval corresponding to the distance $X+Y$ of Fig. 10. The student is now in a position to select the translation for reproduction which will more nearly aid in understanding the translation of the known language by an appropriate selector mechanism, one form of which I have represented at 87 in Fig. 11. The mechanism consists of a bracket support 88 suitably mounted on the frame of the reproducing machine through member 89 and provided with a pair of arms 90 extending transversely of the path of movement of the tape and screw-threaded to receive the very finely pitched screw-threaded shaft 91 which may be manually adjusted through control 92 for moving the reproducing head 93 transversely of the tape 75. For purposes of schematically illustrating the arrangement of the mechanism, the screw-threaded shaft 91 has been shown displaced at an angle and represented in perspective, although the coacting tape has not been correspondingly displaced. It will be understood, however, that the adjustable screw-threaded shaft extends normal to the path of movement of tape 75. The reproducing head 93 is electrically connected at circuit terminals 94 to a reproducing circuit of any suitable type, but may be of the dual type which I have explained in connection with Fig. 4. That is, the reproducing heads 78 and 93 coact to operate a telephone circuit of the type corresponding to 39, 35, 40, of Fig. 4. The screw-threaded shaft 91 may be revolved clockwise to shift reproducing head 93 into alignment with magnetic trace 85 which leads the recording in magnetic trace 84, or the reproducing head 93 may be shifted by revolving screw-threaded shaft 91 counterclockwise to displace reproducing head 93 into alignment with wave trace 86 for reproducing the unknown language in lagging condition with respect to the known language 76. The unknown language may be reproduced simultaneously with the known language 76 by aligning reproducing head 93 with wave trace 84, as illustrated. In other words, the student may select at will the order in which the translation is to be reproduced with respect to the reproduction of the known language by merely displacing the reproducing head 93 to alignment with the wave trace desired for reproduction.

In Fig. 12 I have shown a method of recording and reproduction for the known and unknown languages which has even greater versatility than the arrangements described in connection with Figs. 10 and 11. In the arrangement shown in Fig. 12, the magnetic heads are all aligned in fixed positions transversely of the tape 75, as represented at 95, 96, 97 and 98. These heads are each selectively connectable to either a recording or reproducing system through a double-pole, double-throw switching system, which I have indicated at 99, 100, 101, and 102, respectively. Moving the double-pole, double-throw switches to the up-position connects the respective heads to the reproducing system, diagrammatically illustrated by reproducing amplifier 79 and telephone headset 80. Moving the double-pole, double-throw switches to the down-position places the magnetic heads in a recording circuit constituted by microphone 10, voice control circuit 9, and amplifier 8. Because of the permutation and combination thus permitted by the switching arrangement, differential recordings may be made as follows:

The "unknown" language or translation may be recorded as represented at 85 in a relationship which leads the "known" language previously recorded in wave trace 76.

The "known" language may be recorded in wave trace 76 while reproducing from the "lead" track 85 of the "unknown" language previously recorded, thus recording the "known" language a predetermined time after the "lead" track recording.

The "lag" track 86 of the "unknown" language may be recorded while reproducing from the "known" language 76, thus recording the "lag" in the "unknown" language a predetermined time after the recording of the "known" language.

The "unknown" language may be recorded at 84 simultaneously with the reproduction from the "known" language 76.

Thus the time interval of lag and lead may be selected and determined wholly by the student in providing the desired time interval to contemplate, analyze, and consider the known language with respect to the translation thereof in any one of the relationships of lead, simultaneous reproduction and/or lagging reproduction.

Reference is made to the copending application of A. C. Holt for Indicia Tape Controlling Apparatus, Serial Number 255,278, filed November 7, 1951, now Patent 2,764,639, dated September 25, 1956, showing mechanism for carrying out certain of the methods of my invention as set forth herein.

While I have described my invention in certain preferred embodiments, I realize that various modifications of both the method and apparatus described herein will occur to those skilled in the art and I desire that it be understood that the principles herein set forth shall be considered as illustrative of my invention, and not as limiting my invention to any specific embodiment and that no limitations upon my invention are intended other than may be imposed by the scope of the appended claims.

What I claim and desire to secure by Letters Patent of the United States is as follows:

1. A bilingual system employing a pair of magnetic record reproducers one of which is constituted by a known language record and the other of which is constituted by a correlated unknown language record, a telephone headset including a pair of reproducing telephone receivers, a separate circuit leading to each telephone receiver, one side of each of said circuits being connected in common with said pair of magnetic record reproducers, a selector switch individual to the other side of each of said circuits, a pair of contacts for each of said switches over which the individual switches are movable, one contact of each of said pair of contacts being connected together and to one side of one of said magnetic record reproducers and the other contact of each of said pair of contacts being connected together and to one side of the other of said magnetic record reproducers, and a selector switch bridging the circuit between the aforesaid selector switches whereby the known and unknown languages may be selectively reproduced separately in said separate telephone receivers or reproduced simultaneously in both of said telephone receivers for comparing the phonetic characteristics of the known and unknown languages.

2. A bilingual system employing a pair of magnetic record reproducers one of which is constituted by a known language record and the other of which is constituted by a correlated unknown language record, a telephone reproducing system including a pair of reproducing telephone receivers, a separate circuit leading to each telephone receiver, one side of each of said circuits being connected in common with said pair of magnetic record reproducers, and means connecting the other side of each of said circuits with said reproducers whereby the records on said reproducers may be reproduced in said telephone receivers bilaterally, unilaterally or simultaneously.

3. In a bilingual system, magnetic recording means carrying magnetic records of timed sequences of known and unknown language continuities correlated in phrase groups with respect to each other, magnet heads associated with said magnetic records, a telephone reproducing circuit associated with the magnet heads of said magnetic recording means, said telephone reproducing circuit including a headset for mounting two telephone receivers, and switching means for selectively connecting said telephone receivers with said magnetic recording means for selectively reproducing the time sequences of the known language continuity in one telephone receiver while reproducing the correlated timed sequences of the unknown language continuity in the other telephone receiver, or simultaneously reproducing the timed sequences of either of the known or unknown language continuities in each of said telephone receivers.

4. A binaural, bilingual system comprising a magnetic tape carrying a known timed sequence of a language magnetic record extending longitudinally thereof and translations of said language magnetic record constituted by a plurality of longitudinally extending timed sequence records laterally spaced from the aforesaid record with the correlated continuity of one of said translations disposed in transverse alignment with the corresponding continuity of said known language record, another correlated continuity of said translations disposed in leading relation to said known language magnetic record and another correlated continuity of said translations disposed in lagging relation to said known language magnetic record, means for reproducing said known language magnetic record for reception by one ear of the listener, and separate magnetic means for reproducing any one of the correlated translations of the known language record for reception by the other ear of the listener.

5. A binaural, bilingual system as set forth in claim 4, wherein said separate magnetic means includes a magnetic reproducing head adjustable transversely of the tape into magnetic relationship with any one of the correlated translation records.

References Cited in the file of this patent

UNITED STATES PATENTS

| 1,229,142 | Saenger | June 5, 1917 |
| 2,126,370 | Doolittle | Aug. 9, 1938 |
| 2,209,157 | Glunt | July 23, 1940 |
| 2,237,738 | Kuhlik | Apr. 8, 1941 |
| 2,416,353 | Shipman | Feb. 25, 1947 |
| 2,554,582 | Mallina | May 29, 1951 |
| 2,764,639 | Holt | Sept. 25, 1956 |

FOREIGN PATENTS

| 393,052 | Great Britain | June 1, 1933 |
| 377,276 | Great Britain | July 22, 1932 |
| 396,518 | France | July 29, 1909 |